United States Patent
Kawashima et al.

(10) Patent No.: US 11,847,374 B2
(45) Date of Patent: Dec. 19, 2023

(54) CONTENT PRESENTATION CONTROL DEVICE, PRESENTATION CONTROL METHOD, AND NON-TRANSITORY COMPUTER-READABLE STORAGE MEDIUM

(71) Applicants: DENSO CORPORATION, Kariya (JP); TOYOTA JIDOSHA KABUSHIKI KAISHA, Toyota (JP)

(72) Inventors: Daiki Kawashima, Kariya (JP); Shigeo Katoh, Kariya (JP); Kentaro Teshima, Kariya (JP); Keisuke Okamoto, Chofu (JP); Kazuya Ohtake, Toyota (JP); Hiroshi Majima, Kobe (JP); Kazuki Sasamoto, Chita-gun (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 17/562,720

(22) Filed: Dec. 27, 2021

(65) Prior Publication Data
US 2022/0121409 A1   Apr. 21, 2022

Related U.S. Application Data

(63) Continuation of application No. PCT/JP2020/025335, filed on Jun. 26, 2020.

(30) Foreign Application Priority Data

Jul. 2, 2019 (JP) .................................. 2019-123645

(51) Int. Cl.
*G06F 3/14* (2006.01)
*G06T 19/00* (2011.01)
*B60K 35/00* (2006.01)

(52) U.S. Cl.
CPC ............... *G06F 3/14* (2013.01); *G06T 19/00* (2013.01); *B60K 35/00* (2013.01); *B60K 2370/52* (2019.05)

(58) Field of Classification Search
CPC . G06F 3/14; G06F 16/00; G06F 16/90; G06F 8/20; G06F 11/36; G06F 8/38;
(Continued)

(56) References Cited

U.S. PATENT DOCUMENTS

2009/0199168 A1* 8/2009 Hamada ................. G06F 8/443
717/151
2010/0321170 A1* 12/2010 Cooper .................. G02B 27/01
345/9
(Continued)

FOREIGN PATENT DOCUMENTS

JP     2014137790 A    7/2014
JP     5742799 B2      7/2015

*Primary Examiner* — Abderrahim Merouan
(74) *Attorney, Agent, or Firm* — Harness, Dickey & Pierce, P.L.C.

(57) ABSTRACT

In a presentation control, another presentation request of another content is accepted from another application while presenting a content of one application, which content is preferentially presented is arbitrated based on a rule definition including: an attribute of the content that defines either a cancellation for withdrawing the presentation request or an on-standby without withdrawing the presentation request; and a constraint equation that defines an exception rule for defining a setting of the content that has lost arbitration as either the on-standby or the cancellation; and one of the contents arbitrated is presented to a presentation area.

11 Claims, 19 Drawing Sheets

(58) Field of Classification Search
CPC .... G06T 19/00; B60K 2370/52; B60K 35/00; B60K 37/06; B60K 2370/152; B60K 2370/1523; B60K 2370/167; B60K 2370/182; B60K 2370/1529; B60K 2370/18; G06N 5/025
See application file for complete search history.

(56) References Cited

U.S. PATENT DOCUMENTS

| | | | |
|---|---|---|---|
| 2012/0215404 A1* | 8/2012 | Sugiyama | G09G 5/00 701/36 |
| 2014/0114531 A1* | 4/2014 | Sugiyama | G06F 3/0481 701/36 |
| 2014/0152433 A1* | 6/2014 | Sugiyama | G09G 5/14 340/438 |
| 2015/0363155 A1* | 12/2015 | Hayashi | G01C 21/3629 700/94 |
| 2021/0373676 A1* | 12/2021 | Jorasch | A63F 13/213 |

* cited by examiner

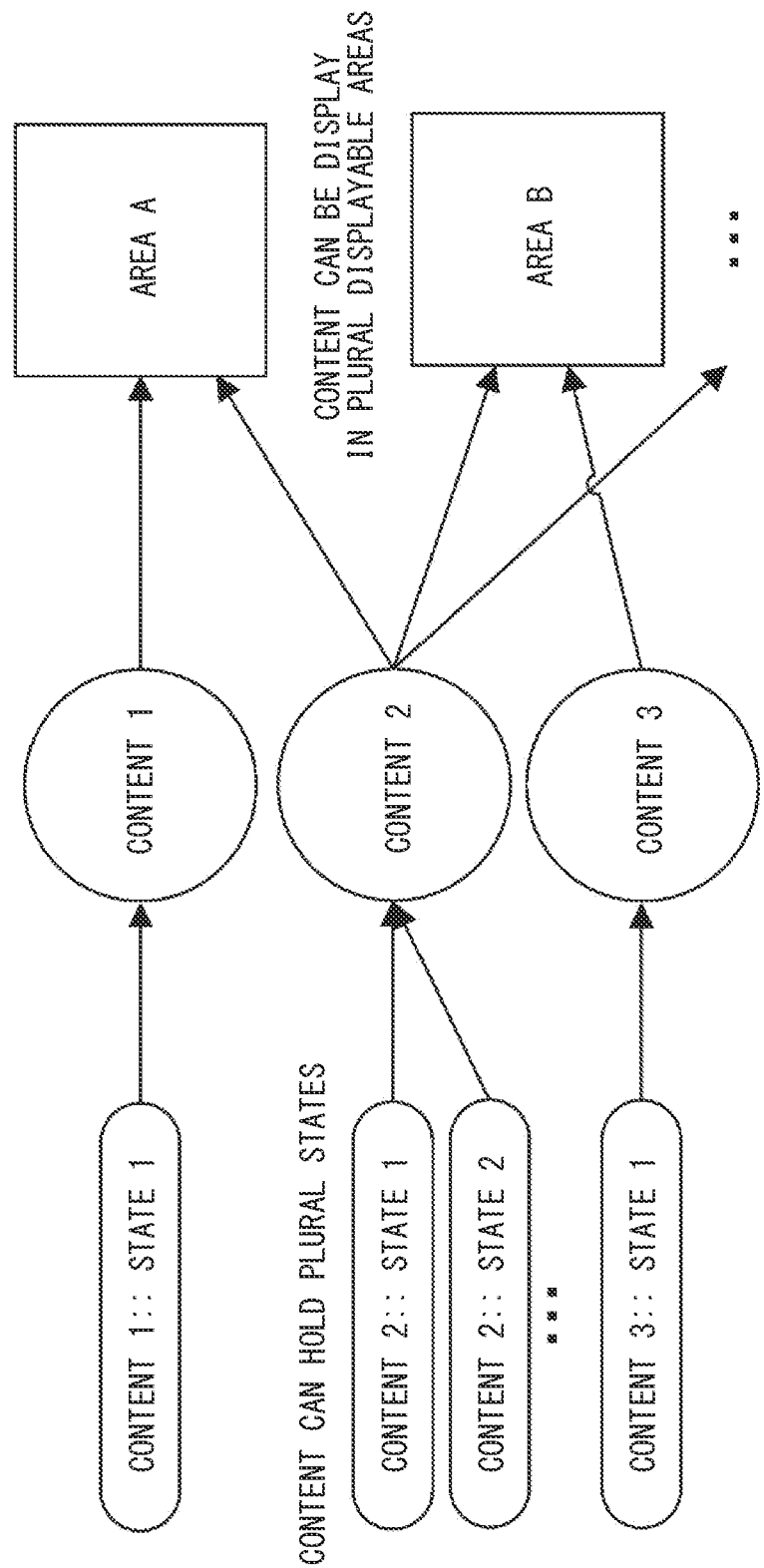

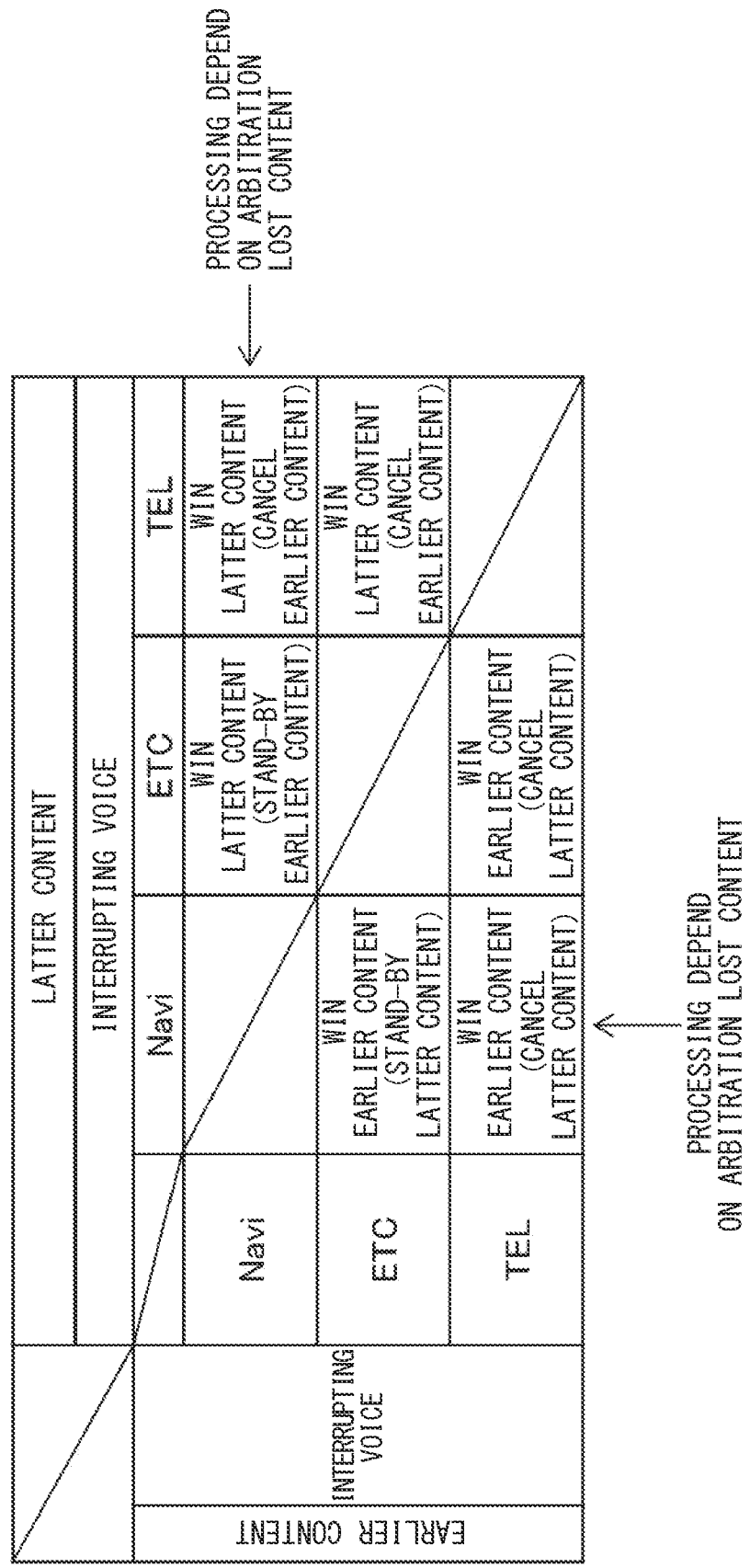

FIG. 8

| TYPE | NAME | LABEL | MEANING |
|---|---|---|---|
| ARBITRATION LOST CONTENT DETERMINATION | ARBITRATION LOST | <CONTENT A>.isDefeatedBy(<CONTENT B>) | CONTENT A LOST TO CONTENT B BY ARBITRATION TRUE IN CASE WHERE CONTENT A IS NOT DISPLAYED, AND CONTENT B IS DISPLAYED IN ANY ONE OF DISPLAYABLE AREAS FOR CONTENT A |
| | ARBITRATION WIN | <CONTENT A>.defeats(<CONTENT B>) | CONTENT A WIN AGAINST CONTENT B BY ARBITRATION TRUE IN CASE WHERE CONTENT A IS NOT DISPLAYED, AND CONTENT A IS DISPLAYED IN ANY ONE OF DISPLAYABLE AREAS FOR CONTENT B SAME AS A CASE OF <CONTENT B> is Defeated By <CONTENT A> |
| | SWITCH NOT TO DISPLAY | <CONTENT>.isDisappeared() | CONTENT IS HIDDEN TRUE IN CASE WHERE CONTENT WAS NOT DISPLAYED PREVIOUSLY, AND CONTENT IS HIDDEN BY CURRENT ARBITRATION |
| | CANCEL | <CONTENT>.isCanceled() | REQUEST FOR CONTENT IS CANCELLED TRUE IN CASE WHERE REQUEST FOR CONTENT IS CANCELLED |

FIG. 9

| EARLIER CONTENT \ LATTER CONTENT | | INTERRUPTING VOICE | | |
|---|---|---|---|---|
| | | Navi | ETC | TEL |
| INTERRUPTING VOICE | Navi | | WIN<br>LATTER CONTENT<br>(STAND-BY<br>EARLIER CONTENT) | WIN<br>LATTER CONTENT<br>(STAND-BY<br>EARLIER CONTENT) |
| | ETC | WIN<br>EARLIER CONTENT<br>(STAND-BY<br>LATTER CONTENT) | | WIN<br>LATTER CONTENT<br>(STAND-BY<br>EARLIER CONTENT) |
| | TEL | WIN<br>EARLIER CONTENT<br>(STAND-BY<br>LATTER CONTENT) | WIN<br>EARLIER CONTENT<br>(STAND-BY<br>LATTER CONTENT) | |

↑ CASE WHERE EXCEPTIONAL RULE NOT EXPRESSED BY ONLY FUNDAMENTAL RUE EXISTS
GO TO FIG. 11

↓ CASE WHERE FUNDAMENTAL RULE INCLUDES CANCELLED CONTENT
GO TO FIG. 10

FIG. 10

| EARLIER CONTENT \ LATTER CONTENT | INTERRUPTING VOICE | | |
|---|---|---|---|
| | Navi | ETC | TEL |
| INTERRUPTING VOICE — Navi | | WIN LATTER CONTENT (CANCEL EARLIER CONTENT) | WIN LATTER CONTENT (CANCEL EARLIER CONTENT) |
| ETC | WIN EARLIER CONTENT (CANCEL LATTER CONTENT) | | WIN LATTER CONTENT (STAND-BY EARLIER CONTENT) |
| TEL | WIN EARLIER CONTENT (CANCEL LATTER CONTENT) | WIN EARLIER CONTENT (STAND-BY LATTER CONTENT) | |

FIG. 11

| EARLIER CONTENT \ LATTER CONTENT | INTERRUPTING VOICE | | |
|---|---|---|---|
| | Navi | ETC | TEL |
| INTERRUPTING VOICE — Navi | | WIN LATTER CONTENT (STAND-BY EARLIER CONTENT) | WIN LATTER CONTENT (CANCEL EARLIER CONTENT) |
| INTERRUPTING VOICE — ETC | WIN EARLIER CONTENT (STAND-BY LATTER CONTENT) | | WIN LATTER CONTENT (STAND-BY EARLIER CONTENT) |
| INTERRUPTING VOICE — TEL | WIN EARLIER CONTENT (CANCEL LATTER CONTENT) | WIN EARLIER CONTENT (STAND-BY LATTER CONTENT) | |

FIG. 16

| | | LATTER CONTENT | | | | |
|---|---|---|---|---|---|---|
| | | INTERRUPTING VOICE | | | | |
| | | Navi | ETC | TEL | VOICE RECOGNITION | SIGN RECOGNITION |
| EARLIER CONTENT | Navi | | WIN LATTER CONTENT (STAND-BY EARLIER CONTENT) | WIN LATTER CONTENT (CANCEL EARLIER CONTENT) | WIN LATTER CONTENT (STAND-BY EARLIER CONTENT) | WIN LATTER CONTENT (STAND-BY EARLIER CONTENT) |
| | ETC | WIN EARLIER CONTENT (STAND-BY LATTER CONTENT) | | WIN LATTER CONTENT (CANCEL EARLIER CONTENT) | WIN LATTER CONTENT (STAND-BY EARLIER CONTENT) | WIN LATTER CONTENT (STAND-BY EARLIER CONTENT) |
| INTERRUPTING VOICE | TEL | WIN EARLIER CONTENT (CANCEL LATTER CONTENT) | WIN EARLIER CONTENT (CANCEL LATTER CONTENT) | | WIN EARLIER CONTENT (CANCEL LATTER CONTENT) | WIN EARLIER CONTENT (CANCEL LATTER CONTENT) |
| | VOICE RECOGNITION | WIN EARLIER CONTENT (STAND-BY LATTER CONTENT) | WIN EARLIER CONTENT (STAND-BY LATTER CONTENT) | WIN LATTER CONTENT (CANCEL EARLIER CONTENT) | | WIN LATTER CONTENT (STAND-BY EARLIER CONTENT) |
| | SIGN RECOGNITION | WIN EARLIER CONTENT (STAND-BY LATTER CONTENT) | WIN EARLIER CONTENT (STAND-BY LATTER CONTENT) | WIN LATTER CONTENT (CANCEL EARLIER CONTENT) | WIN EARLIER CONTENT (STAND-BY LATTER CONTENT) | |

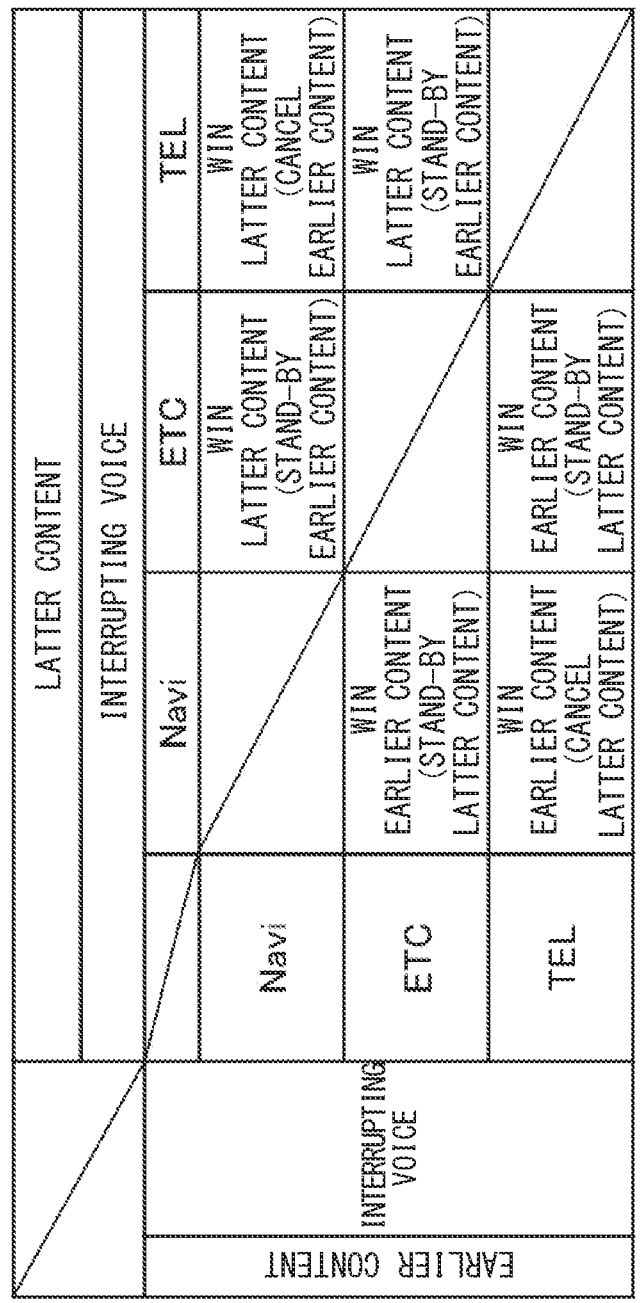

FIG. 18

| INTERRUPTING VOICE \ LATTER CONTENT | Navi | ETC | TEL | VOICE RECOGNITION | SIGN RECOGNITION |
|---|---|---|---|---|---|
| Navi | | WIN LATTER CONTENT (STAND-BY EARLIER CONTENT) | WIN LATTER CONTENT (CANCEL EARLIER CONTENT) | WIN LATTER CONTENT (CANCEL EARLIER CONTENT) | WIN LATTER CONTENT (CANCEL EARLIER CONTENT) |
| ETC | WIN EARLIER CONTENT (STAND-BY LATTER CONTENT) | | WIN LATTER CONTENT (STAND-BY EARLIER CONTENT) | WIN LATTER CONTENT (STAND-BY EARLIER CONTENT) | WIN LATTER CONTENT (STAND-BY EARLIER CONTENT) |
| TEL | WIN EARLIER CONTENT (CANCEL LATTER CONTENT) | WIN EARLIER CONTENT (LATTER CONTENT) | | WIN LATTER CONTENT (STAND-BY EARLIER CONTENT) | WIN LATTER CONTENT (STAND-BY EARLIER CONTENT) |
| VOICE RECOGNITION | WIN EARLIER CONTENT (CANCEL LATTER CONTENT) | WIN EARLIER CONTENT (LATTER CONTENT) | WIN EARLIER CONTENT (LATTER CONTENT) | | WIN LATTER CONTENT (STAND-BY EARLIER CONTENT) |
| SIGN RECOGNITION | WIN EARLIER CONTENT (CANCEL LATTER CONTENT) | WIN EARLIER CONTENT (LATTER CONTENT) | WIN EARLIER CONTENT (STAND-BY LATTER CONTENT) | WIN EARLIER CONTENT (STAND-BY LATTER CONTENT) | |

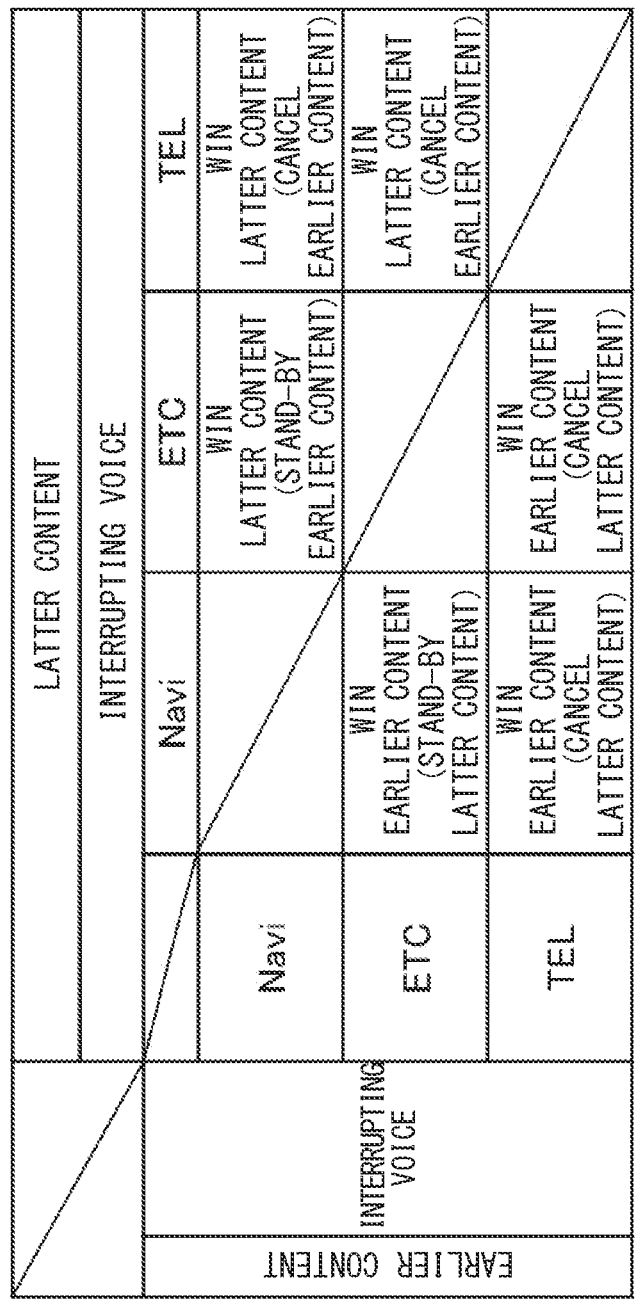

FIG. 20

| | | LATTER CONTENT | | | | | |
|---|---|---|---|---|---|---|---|
| | | INTERRUPTING VOICE | | | | | |
| | | Navi | ETC | TEL | VOICE RECOGNITION | SIGN RECOGNITION | |
| INTERRUPTING VOICE | Navi | | WIN LATTER CONTENT (STAND-BY EARLIER CONTENT) | WIN LATTER CONTENT (CANCEL EARLIER CONTENT) | WIN LATTER CONTENT (CANCEL EARLIER CONTENT) | WIN LATTER CONTENT (CANCEL EARLIER CONTENT) | |
| | ETC | WIN EARLIER CONTENT (STAND-BY LATTER CONTENT) | | WIN LATTER CONTENT (CANCEL EARLIER CONTENT) | WIN LATTER CONTENT (CANCEL EARLIER CONTENT) | WIN LATTER CONTENT (CANCEL EARLIER CONTENT) | |
| | TEL | WIN EARLIER CONTENT (CANCEL LATTER CONTENT) | WIN EARLIER CONTENT (CANCEL LATTER CONTENT) | | WIN LATTER CONTENT (STAND-BY EARLIER CONTENT) | WIN LATTER CONTENT (STAND-BY EARLIER CONTENT) | |
| | VOICE RECOGNITION | WIN EARLIER CONTENT (CANCEL LATTER CONTENT) | WIN EARLIER CONTENT (CANCEL LATTER CONTENT) | WIN EARLIER CONTENT (STAND-BY LATTER CONTENT) | | WIN LATTER CONTENT (STAND-BY EARLIER CONTENT) | |
| | SIGN RECOGNITION | WIN EARLIER CONTENT (CANCEL LATTER CONTENT) | WIN EARLIER CONTENT (CANCEL LATTER CONTENT) | WIN EARLIER CONTENT (STAND-BY LATTER CONTENT) | WIN EARLIER CONTENT (STAND-BY LATTER CONTENT) | | |
| EARLIER CONTENT | | | | | | | |

CONTENT PRESENTATION CONTROL DEVICE, PRESENTATION CONTROL METHOD, AND NON-TRANSITORY COMPUTER-READABLE STORAGE MEDIUM

CROSS REFERENCE TO RELATED APPLICATIONS

The present application is a continuation application of International Patent Application No. PCT/JP2020/025335 filed on Jun. 26, 2020, which designated the U.S. and claims the benefit of priority from Japanese Patent Application No. 2019-123645 filed on Jul. 2, 2019. The entire disclosures of all of the above applications are incorporated herein by reference.

TECHNICAL FIELD

The present disclosure relates to a content presentation control device, a presentation control method, and a non-transitory computer-readable storage medium.

BACKGROUND

For example, the content displayed on the display device installed in the vehicle and the content output from the sound output device are a variety of features. Examples of this type of content include a content of the travelling system related to vehicle running, a content of the non-travelling system not related to vehicle running, and the like. Examples of the content of the traveling system include vehicle speed, engine speed, shift position, remaining amount of fuel, and the like. Examples of the content of the non-travelling system include map information for navigation, audio information, telephone information, and the like.

SUMMARY

According to an example, in a presentation control, another presentation request of another content is accepted from another application while presenting a content of one application, which content is preferentially presented is arbitrated based on a rule definition including: an attribute of the content that defines either a cancellation for withdrawing the presentation request or an on-standby without withdrawing the presentation request; and a constraint equation that defines an exception rule for defining a setting of the content that has lost arbitration as either the on-standby or the cancellation; and one of the contents arbitrated is presented to a presentation area.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram showing the relationship between a content, a state, and an area;
FIG. 7 is a diagram showing a specification;
FIG. 8 is a diagram showing the syntax of a predicate logic expression;
FIG. 9 is a diagram showing a specification;
FIG. 10 is a diagram showing a specification;
FIG. 11 is a diagram showing a specification;
FIG. 16 is a diagram showing a specification after the change;
FIG. 17 is a diagram showing a specification before the change;
FIG. 18 is a diagram showing a specification after the change;
FIG. 19 is a diagram showing a specification before the change;
and
FIG. 20 is a diagram showing a specification after the change.

DETAILED DESCRIPTION

Figure 1:
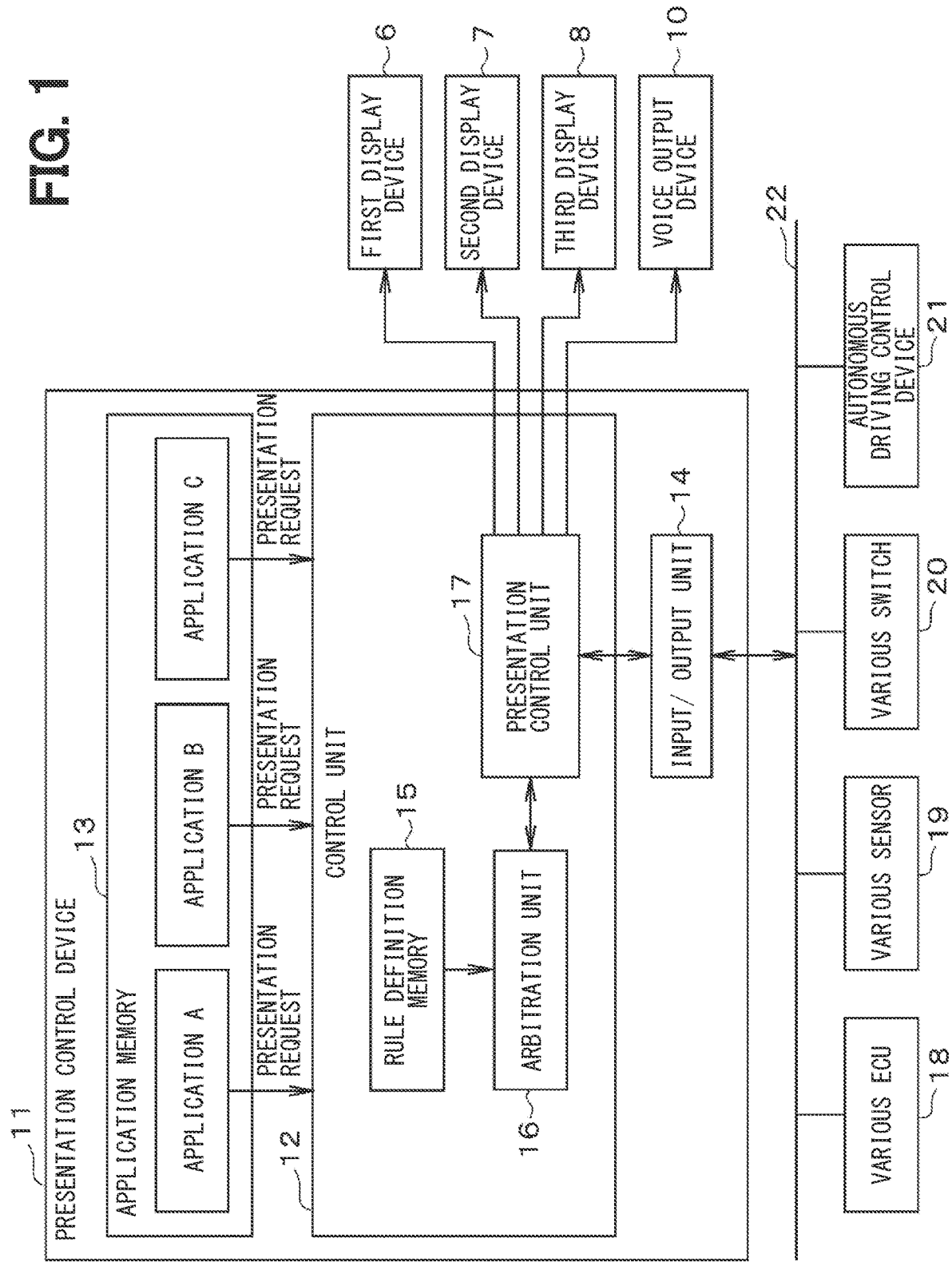
FIG. 1 is a functional block diagram showing a configuration of a presentation control device according to an embodiment.

Content is presented in response to a content presentation request from the application. That is, the display content is displayed in response to a display request from the application, and the voice output content is output in response to a voice output request from the application. In this case, when a content presentation request is generated from another application while the content of one application is being presented, arbitration is performed as to which content is to be presented with priority.

In rule-based arbitration, for example, when there are a plurality of contents that are candidates for presentation, arbitration is performed based on the rule definition, and the content to be presented with priority is determined. The content that lost the arbitration must be set in a "standby mode" that does not withdraw the presentation request in order to be presented after the presentation of the content that has won the arbitration is completed, and must be set in a "cancel mode" that withdraws the presentation request in order not to be presented.

In the conceivable rule-based arbitration, the setting of the content that lost the arbitration depends on itself, and it is not possible to select whether to set as "a standby mode" or "a cancel mode". However, in a configuration in which the setting of the content that has lost arbitration cannot be selected because of depending on itself, there are the following inconveniences.

For example, a case where the setting when the arbitration of the navigation content related to the navigation function is lost is "a standby mode" will be described. When an ETC content audio output request related to the ETC (Electronic Toll Collection) function is generated by an interrupt during the audio output of the navigation content, the navigation content loses arbitration, and the navigation content that has lost the arbitration waits for the audio output request. That is, the audio output of the navigation content is interrupted, and after the audio output of the ETC content is completed, the audio output of the navigation content is restarted. Further, when the voice output request of the telephone content related to the telephone function is generated by an interrupt during the voice output of the navigation content, the navigation content loses arbitration, and the navigation content that has lost the arbitration waits for the voice output request. That is, the audio output of the navigation content is interrupted, and after the audio output of the telephone content is completed, the audio output of the navigation content is restarted.

Here, for example, when the voice output request of the telephone content is generated by an interrupt while the voice output of the right turn guidance at the intersection is performed as the navigation content, the voice output of the right turn guidance is interrupted, and after the voice output of the telephone content is completed, the voice output of the right turn guidance is restarted. Here, when the voice output time of the telephone content becomes long and the vehicle completes the right turn before the voice output of the telephone content ends, inappropriate information is given to the user by restarting the voice output of the right turn guidance.

Under these circumstances, it may be desired that the setting of the content that lost the arbitration can be changed according to the content that has won the arbitration, that is, the content of the arbitration target. In this case, a method of defining the setting of the content that lost the arbitration in a matrix according to the combination of the arbitrated contents can be considered. However, in such a method of defining in a matrix, as the number of contents increases, the number of combination patterns increases, and it becomes difficult to define all the settings.

On the other hand, for example, a conceivable technique teaches a method of canceling the content that has lost arbitration according to the time characteristic of the voice output content when the audio output time of the content that has won arbitration is longer than the expiration date of the content that has lost arbitration.

In the above conceivable method, it is necessary to finely define time parameters such as the voice output time and the expiration date for each voice output content, and there may be a difficulty that the maintainability of the rule definition is remarkably lowered. Under these circumstances, a method of freely changing the setting of the content that has lost arbitration without reducing the maintainability of the rule definition may be desired.

In view of the above points, the setting of a content that has lost arbitration is freely changeable without reducing the maintainability of the rule definition.

According to one feature of the present embodiments, the application storage unit can store the application that generates the content presentation request. The rule definition storage unit stores a rule definition that includes: an attribute of the content that defines either a cancellation for withdrawing the presentation request or a wait that does not withdraw the presentation request; and a constraint expression that defines an exception rule that defines the setting of the content that has lost arbitration as either a wait or a cancellation. When a content presentation request is generated from another application while the content of one application is being presented, the arbitration unit arbitrates which content is preferentially presented based on the rule definition stored in the rule definition storage unit. The presentation control unit presents the content arbitrated by the arbitration unit to the presentation area.

A rule definition is memorized such that includes: an attribute of the content that defines either a cancellation for withdrawing the presentation request or a wait that does not withdraw the presentation request; and a constraint expression that defines an exception rule that defines the setting of the content that has lost arbitration as either a wait or a cancellation. When a content presentation request is generated from another application while the content of one application is being presented, the content to be presented with priority is arbitrated based on the rule definition. As the setting of the content that has lost arbitration, the setting of the content that has lost the arbitration can be freely changed by defining the default setting of the content with the content attribute and the exceptional setting of the content with the constraint expression. In this case, since only the exception rule needs to be defined by the constraint expression, it is possible to avoid reduction of the maintainability of the rule definition. As a result, the setting of the content that lost the arbitration can be freely changed without reducing the maintainability of the rule definition.

Figure 2:
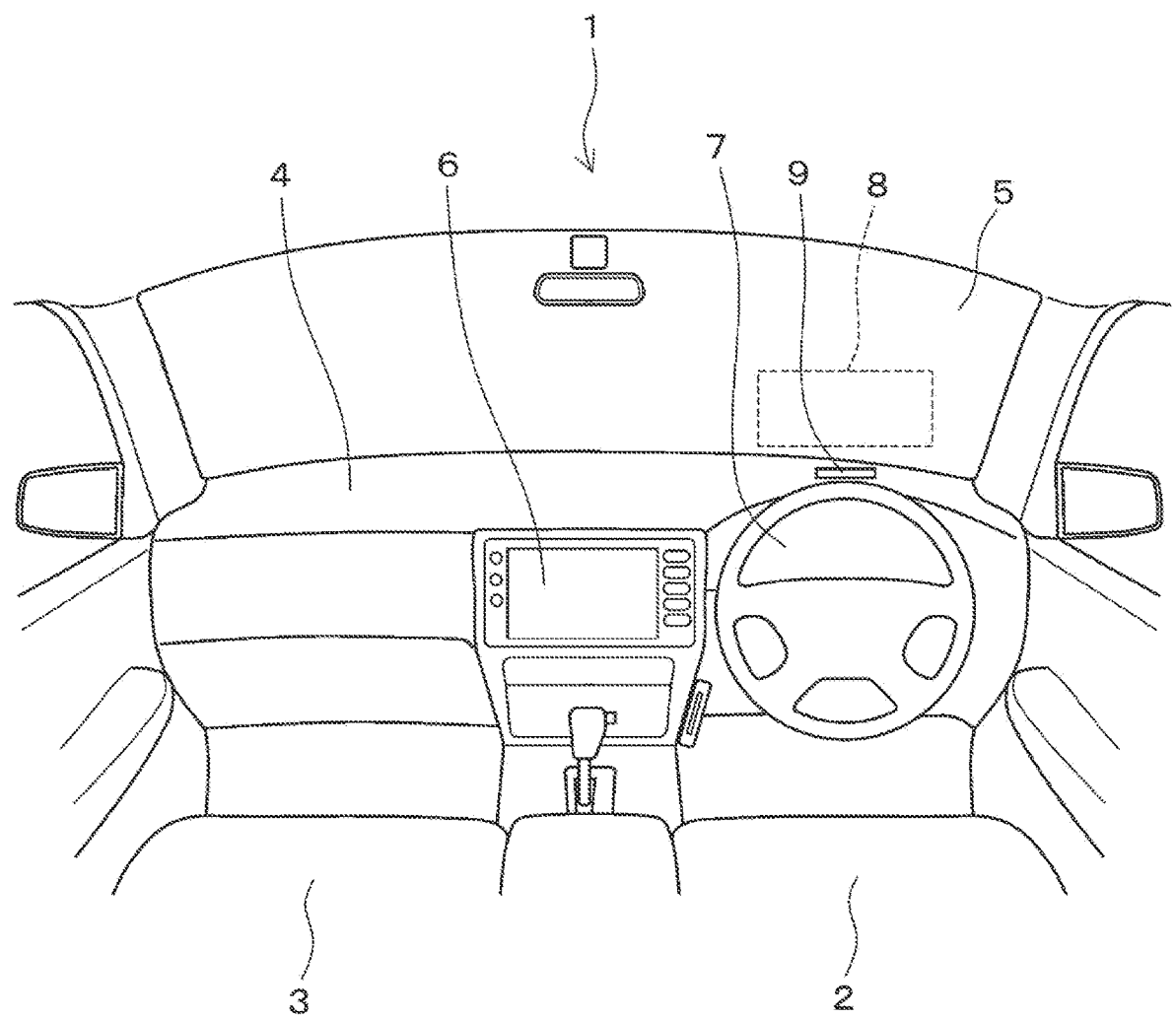
FIG. 2 is a perspective view showing a vehicle compartment.

The following will describe an embodiment of the present disclosure with reference to the accompanying drawings. As shown in FIG. 2, a driver seat 2 and a passenger seat 3 are arranged in the vehicle compartment 1 of the vehicle, and an instrument panel 4 is arranged in front of them. A windshield 5 is mounted on the front end of the instrument panel 4 so as to stand up. A first display device 6 and a second display device 7 are arranged on the instrument panel 4, and a third display device 8 is arranged on the windshield 5.

The first display device 6 is, for example, a center display including a full-color liquid crystal display device, and basically functions as a display unit for displaying non power train content that is not related to vehicle traveling. The non-power train content includes, for example, map information for navigation, audio information, telephone information, and the like. The first display device 6 also functions as a display unit that displays an image of the rear of the vehicle captured by the rear camera when the vehicle is moving backward. The second display device 7 is, for example, a meter display including a full-color liquid crystal display device, and basically functions as a display unit for displaying power train content that is related to vehicle traveling. The content of the power train is, for example, vehicle speed, engine speed, shift position, remaining amount of fuel, and the like. The third display device 8 is a head-up display in which an image is projected from the display unit 9 arranged on the instrument panel 4 onto the windshield 5, and basically functions as a display unit that displays a power train content, similar to the second display device 7. Each of the display devices 6 to 8 includes one or a plurality of areas for displaying the content.

A voice output device 10 (see FIG. 1) is arranged at a predetermined position in the vehicle compartment 1. The voice output device 10 includes one or a plurality of speakers, and functions as an audio output unit that outputs audio for power train content and non-power train content. In such a configuration, the content is displayed on each of the display devices 6 to 8, and the content is output by the voice output device 10, so that various information including the content of the traveling system and the content of the non-traveling system can be presented to the passenger.

As shown in FIG. 1, the presentation control device 11 (corresponding to the content presentation control device) has a control unit 12, an application storage unit 13, and an input/output i.e., I/F 14. A plurality of applications A to C are stored in advance in the application storage unit 13. When one or more content presentation requests are generated, the applications A to C interrupt and output a presentation request indicating the presentation target, the presentation area, and the content to the control unit 12. That is, when the content display request to the display devices 6 to 8 is generated, each of the applications A to C interrupts and outputs a presentation request indicating the display target, the area, and the content to the control unit 12. The area is a region allocated when displaying the content. Further, when the content audio output request to the voice output device 10 is generated, each of the applications A to C interrupts and outputs a presentation request indicating the audio output target, the zone, and the content to the control unit 12. The zone is an area allocated when the content is output as audio.

The control unit 12 has a microcomputer including a CPU (Central Processing Unit), a ROM (Read Only Memory), a RAM (Random Access Memory), an I/O (Input/Output), and the like, and executes a program stored in a non-transitory tangible storage medium to control the operation of the presentation control device 11. The control unit 12 includes a rule definition storage unit 15, an arbitration unit 16, and a presentation control unit 17.

The rule definition is stored in the rule definition storage unit 15. The rule definition includes an arbitration policy that defines basic arbitration when assigning a content to an area or a zone, and a constraint expression. The arbitration policy is always set by any of priority arbitration, latter content win arbitration, and value-based arbitration, as will be described later. The constraint expression may not be limited to one, and may not be provided or may be provided with a plurality of equations according to the intention of the writer.

The arbitration unit 16 arbitrates the content to be allocated to the presentation area based on the rule definition stored in the rule definition storage unit 15. The arbitration unit 16 may interrupt and output presentation requests at the same time from a plurality of different applications. In such a case, the arbitration unit 16 arbitrates which content is to be presented with priority. "Simultaneous" here may not mean at the same time in chronological time, alternatively, may mean a state in which a content presentation request is generated from another application while one application is presenting the content, that is, two or more applications interrupt and output presentation requests at the same time.

The presentation control unit 17 is connected to various ECUs 18, various sensors 19, various switches 20, an autonomous driving control device 21, and the like via an input/output I/F 14 through an in-vehicle network 22. The in-vehicle network 22 is, for example, CAN (Controller Area Network, registered trademark) or the like. When the content is arbitrated by the arbitration unit 16, the presentation control unit 17 displays the content assigned by the arbitration in a predetermined area or outputs a voice from the predetermined zone.

The rule-based arbitration will be described below. Here, the case where the content is displayed in the area will be described, similarly, the basic idea is the same for the case where the content is output as audio from the zone.

(1) Rule-Based Arbitration

The rule-based arbitration describes an arbitration method in which the content is arbitrated and allocated to an arbitrary area based on a predetermined rule. Area definitions, content definitions, and constraint expressions are required as rule definitions in rule-based arbitration.

(1-1) Area Definition

The area definition defines the display location, the value of the display location, and the arbitration policy. Since arbitration is performed for each area, an arbitration policy is defined for each area.

In the area, a frame for displaying the content on the display devices 6 to 8 is defined. Only one content is assigned to an area.

Area is defined as follows.

The area displays the allocated content.
The area has an arbitration policy.
The area refers to the content that can be displayed.
The area has one or more sizes.

Each area has properties. The priority, Z-order, arbitration policy, and size are set as properties.

(A) Priority

The priority is a value (in a range between 0% and 100%) indicating the value of the area itself. The arbitration is performed in order from the area with the highest priority value.

(B) Z order

The Z-order is a coordinate with respect to a height. The higher the Z-order value, the more it is displayed on the front side. When there are areas with the same priority, arbitration is performed in descending order of Z-order value.

(C) Arbitration Policy

The arbitration policy is one of priority arbitration, latter win arbitration, and value-based arbitration.

(C-1) Priority Arbitration

Figure 3:
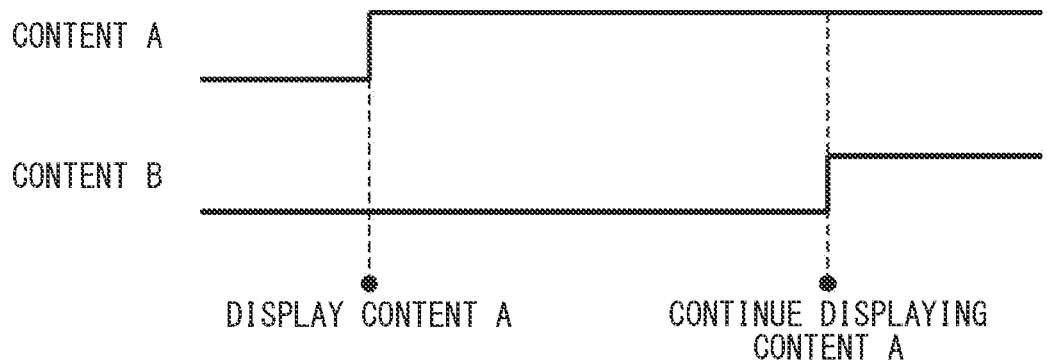
FIG. 3 is a diagram showing priority arbitration.

The priority arbitration is an arbitration policy for each area, and as shown in FIG. 3, it is arbitration that displays the content having the highest priority among the contents that can be displayed in the area.

(C-2) Latter Win Arbitration

Figure 4:
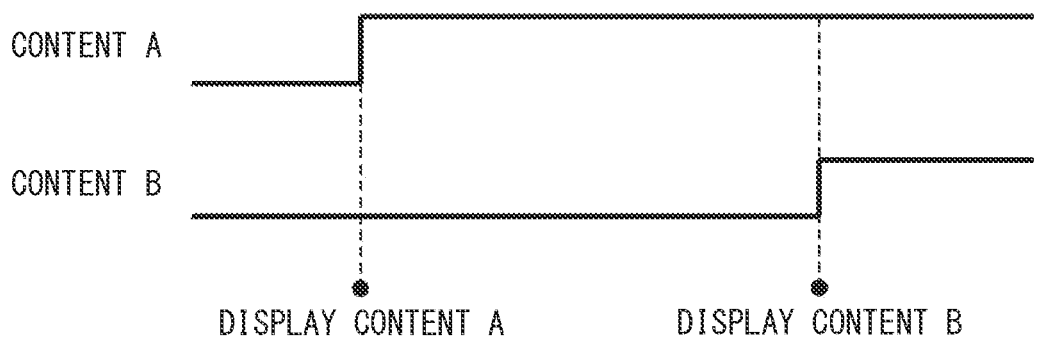
FIG. 4 is a diagram showing a latter-content-win arbitration.

The latter win arbitration is an area-based arbitration policy. As shown in FIG. 4, the content of the last request in the area is displayed, and when the display of the last request content is finished, the second last request among the remaining contents is displayed.

(C-3) Value-Based Mediation

Value-based arbitration is an arbitration policy for the entire area, and is arbitration that displays the content that maximizes the calculated value obtained by multiplying the numerical value that quantifies the value of the content and the numerical value that quantifies the value of the area.

(D) Size

Figure 5:
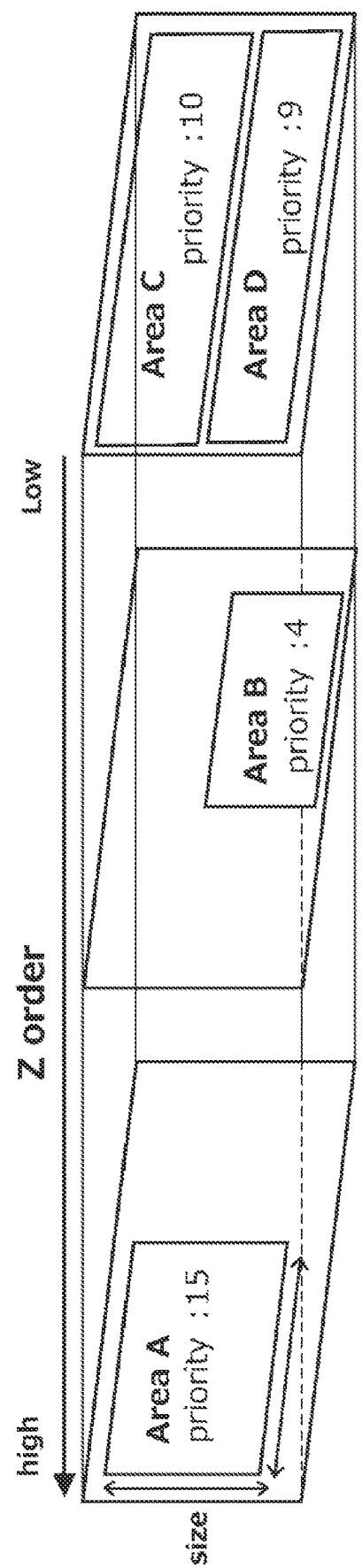
FIG. 5 is a diagram showing the relationship between the Z-order of an area and the priority.

The size is the size of the area, which is defined by a vertical size x a horizontal size. When more than one sizes are defined, it is determined according to the size of the content. The relationship between the Z-order of the area and the priority is shown in FIG. 5.

(1-2) Content Definition

The content definition defines the displayable area, the state of the content, and the value of the state of the content. The content can have multiple states, the content is assigned to the area, and the content status is displayed. The content defines and refers to the area in which the content itself can be displayed.

In the content, the content to be displayed in the area defined on the display screens of the display devices 6 to 8 is defined. Only one content is assigned to an area.

Content is defined as follows.

Content is assigned to the area.
The content refers to one or more areas in which the content itself can be displayed.
The content always has one or more states.
Content has one or more sizes.

When there are a plurality of displayable areas, the content can be displayable in any one of areas, and one content can be displayed in a plurality of areas at the same time. One content can have a plurality of states, and when a plurality of states are held, each state is exclusive and can always be displayed only in one state at a time. The content can have multiple sizes, and when there are multiple sizes, the closest size is displayed according to the size of the display target area. The relationship between a content, a state, and an area is linked as shown in FIG. 6.

The content has a property, and the property is set with an attribute indicating the priority, the size, the feature whether the presentation request is withdrawn (i.e., cancelled) or not withdrawn (i.e., on standby) when the content loses the arbitration.

(A) Priority

The priority is a value used when the arbitration policy of the area is "priority arbitration", and the content having a high priority is assigned to the area first.

(B) Size

The size is the display size of the content and is defined by a vertical size x a horizontal size. When more than one sizes are defined, it is determined according to the size of the area.

(1-3) Constraint Equation

A constraint equation is a rule that describes the properties that must be exceptionally satisfied during or after arbitration. By suppressing the state of arbitration with a constraint equation, it is possible to express a state that cannot be expressed by the arbitration policy as it is, or to use it for determining the arbitration result after arbitration. That is, for example, depending on the situation such as the running state of the vehicle, it may be better not to display even the content assigned by the arbitration policy. The constraint equation defines the conditions for content suppression and area suppression, which are the conditions that the arbitration result must satisfy.

The logical equation that can be handled by the constraint equation are the content state, the area state, the content being displayed in the area, the set of the area and the content, the scene state, the logical operation, and the quantification symbol. The scene is, for example, a manual driving scene or an automatic driving scene by the autonomous driving device 19, and display control is possible in which the content of the manual driving content group is not displayed in the autonomous driving scene.

(A) The content state is either active/inactive or displayed/hidden.

(B) The state of the area is either displayed or hidden.

(C) The logical operations are NOT (!), AND, OR, implication (→), and equal sign (=).

The quantification symbol includes ∀ (For all: the condition is satisfied for all elements of the set) and ∃ (Exists: at least one element satisfying the condition exists in the set)

(D) Constraint Equation

The constraint equation affects the result of the arbitration logic, and the arbitration logic i set to satisfy all constraints.

(1-4) Content Suppression

For example, "central area.displaying Content ( )=c1→! C2.is Visible ( )" is exemplified as a constraint equation that the content c2 is not displayed while the content c1 is being displayed. This constraint equation describes the suppression that the content c2 is not displayed when the content c1 is being displayed in the central area.

(1-5) Priority Arbitration and Latter Win Arbitration

When priority arbitration and latter win arbitration coexist, it is possible to handle them by setting the arbitration policy of the area to the latter win policy and by describing only the relationship between the contents related to the priority with a constraint equation.

As such a constraint equation, "telephone.is Active ( )→For All MM type interrupt (other than telephone) {x|! X.is Visible ( )}" is illustrated. The arbitration policy is the area of the latter win arbitration, and describes the suppression that all multimedia type interrupts (other than the telephone) are not displayed when the content with the high priority, i.e., the telephone, is active by adding this constraint equation.

(2) Arbitration Logic

The arbitration logic is an algorithm that defines how to allocate the content to satisfy a constraint equation based on an area arbitration policy according to a predetermined rule. Basically, the arbitration is performed in order of priority for each area. The arbitration logic includes arbitration within the area and arbitration for the entire area.

(2-1) Arbitration in the Area (A) For arbitration within the area, the areas in the priority arbitration and the latter win arbitration are arbitrated in descending order of priority.

(B) Evaluate the following feature for each area.

Temporarily assign the highest priority content, and when the evaluation result of the constraint equation is true (TRUE), determine the temporarily assigned content. When the evaluation result of the constraint equation is false (FALSE), the next highest priority content is re-evaluated. When there is no content that satisfies the constraint equation, no content is displayed in that area.

(2-2) Arbitration of the Entire Area

The arbitration (i.e., value-based arbitration) for the entire area includes best fit logic and one pass logic.

(A) The best fit logic selects the highest total value among all the combinations of the contents satisfying the constraint equation and the areas.

(B) The one-pass logic assigns the content with the highest priority to the area in order from the area with the higher priority, and excludes the content already assigned to the other area. In this embodiment, the one-pass logic is adopted, alternatively, the best-fit logic may be adopted.

In the conceivable rule-based arbitration, the setting of the content that lost the arbitration depends on itself, and it is not possible to select whether to set as "a standby mode" or "a cancel mode". That is, the setting of the content that lost the arbitration cannot be selected according to the content that won the arbitration. Due to such circumstances, the specifications shown in FIG. 7 cannot be established by the conceivable rule-based arbitration. Specifically, the setting of the navigation content that lost the arbitration cannot be set to "on standby" when the opponent content which wins the arbitration is ETC content, and cannot be set to "cancel" when the opponent content which wins the arbitration is the telephone content. In this case, in the method of defining the setting of the content that lost the arbitration in a matrix according to the combination of the contents to be arbitrated, it may be difficult to define all the settings since the pattern of the combinations increases as the number of contents increases. Under these circumstances, the following configuration is adopted in this embodiment.

As shown in FIG. 8, in the determination process for standby and cancellation in case of losing the arbitration, a constraint equation for the determination process for standby and cancellation in case of losing the arbitration is formed using the syntax of the predicate logic expression representing the arbitration result and the setting of the content.

An example of description of the constraint equation of the determination process for standby and cancellation in case of losing the arbitration will be described below.

Example 1

The constraint equation of "If content A loses arbitration to content B, the request for presentation of content A is canceled" is:

{Content A.isDefeatedBy (Content B)→Content A.isCanceled ( )}.

Example 2

The constraint equation of "If content A loses arbitration to content B, the request for presentation of content A is on standby" is:
{Content A.isDefeatedBy (Content B)→Content A.isStandby ( )}.

Example 3

The constraint equation of "If content A loses arbitration to either content B or content C, the request for presentation of content A is on standby" is
{Content A.isDefeatedBy (Content B) XOR Content A.isDefeatedBy (Content C)→! Content A.isStandby ( )}.

In the above constraint equation, the term "IsDefeatedBy" can be replaced with "defeats". The constraint equation of (Example 1) is synonymous with the constraint equation of
{Content B.defeats (Content A)→Content A.isCanceled ( )}.

The constraint equation of (Example 2) is synonymous with the constraint equation of
{Content B.defeats (Content A)→Content A.isStandby ( )}.

Specifically, in the specifications shown in FIG. 7, the constraint equation of "Navigation content cancels the request to present the navigation content when the navigation content loses the arbitration to the telephone content" is
{Navi.isDefeatedBy(TEL)→Navi.isCanceled( )}.

The constraint equation of "Navigation content stands by for a request to present Navigation content if the navigation content loses arbitration to ETC content" is
{Navi.isDefeatedBy(ETC)→! Navi.isStandby( )}.

The basic rules for losing arbitration will be explained. For the setting when the content loses arbitration, the default value (as a basic rule) is described, and the default value is described as a syntax of
{GoodLoser: [true/false]}.

As shown in FIG. 9, in the navigation content, ETC content, and telephone content, when the basic rule when the arbitration is lost is "on standby", the rule definition is
Navi{GoodLoser: false}
ETC{GoodLoser: false}, and
TEL{GoodLoser: false}.

When the basic rule includes "a cancel mode" content, the rule definition is changed. When the specifications shown in FIG. 10 is adopted, the rule definition is
Navi{GoodLoser: true}
ETC{GoodLoser: false}, and
TEL{GoodLoser: false}.

When there is an exception rule that cannot be expressed only by the basic rule, the constraint equation is described as an exception rule. When the specifications shown in FIG. 11 is adopted, the rule definition is
Navi{GoodLoser: false}
ETC{GoodLoser: false}, and
TEL{GoodLoser: false}.
And the constraint equation is
{Navi.isDefeatedBy(TEL)→Navi.isCanceled( )}.

After the arbitration process for allocating the content to the zone by the arbitration logic, the arbitration loss standby and cancellation determination process is performed as a post-process for changing the request state, that is, the setting of the arbitration-loss content. In the post-processing, the constraint equation of the standby and cancellation determination processing at the time of arbitration loss is evaluated, and the state of the content request is changed.

Next, the overall processing and post-processing of the arbitration logic performed by the arbitration unit 16 will be described. Here, in all content,
the definition of {GoodLoser: false} is set.
Then, the case where the basic rule of the setting when the arbitration is lost is "a standby mode" will be described.

(1) Overall Processing of Arbitration Logic

Figure 12:
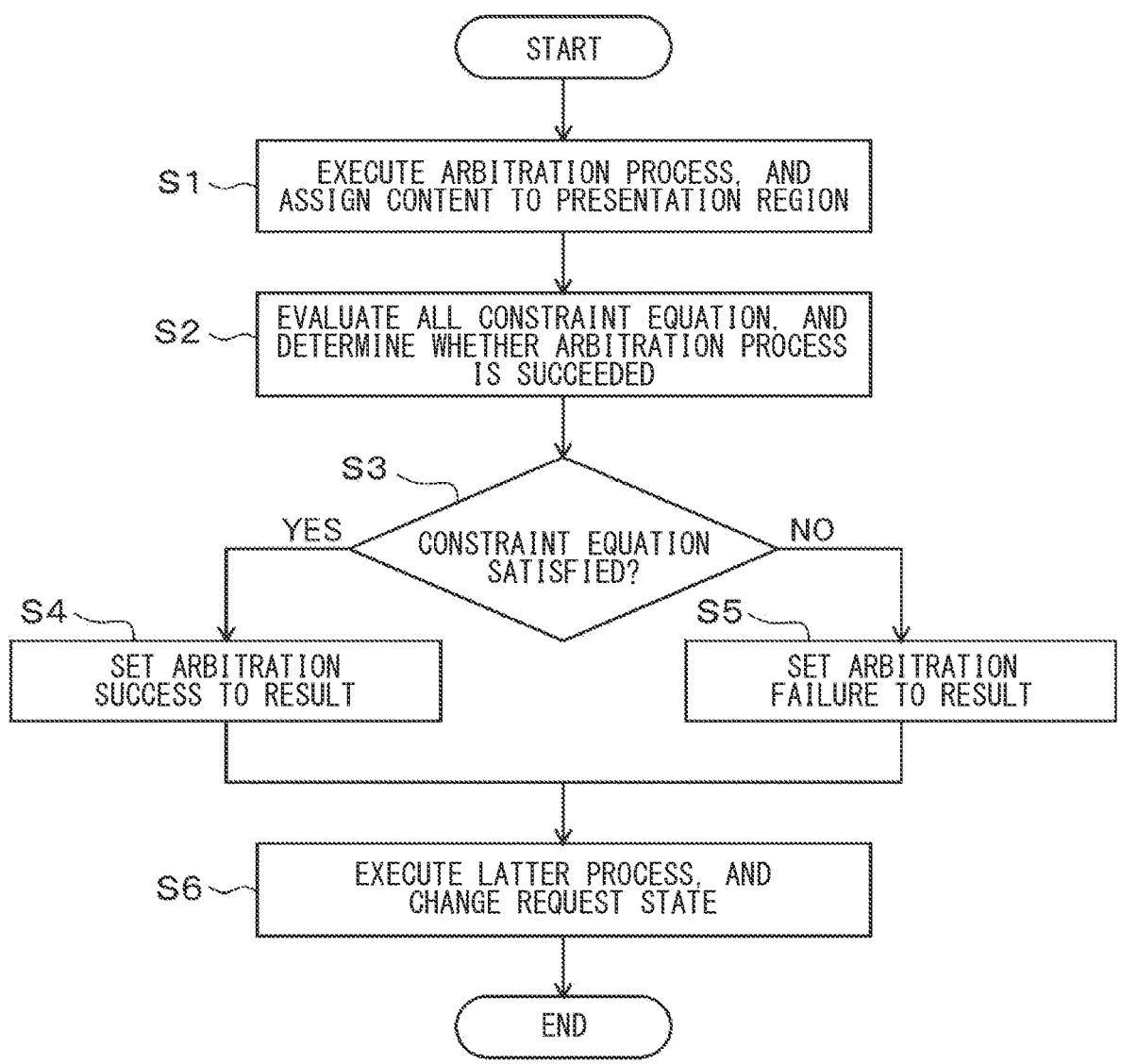
FIG. 12 is a flowchart showing the entire processing of the arbitration logic.

As shown in FIG. 12, the arbitration unit 16 performs the entire processing of the arbitration logic. When the arbitration unit 16 receives a content presentation request from another application while presenting the content of one application (corresponding to the presentation request reception procedure and the presentation request reception process), the arbitration unit 16 performs the arbitration process and allocates the content in the presentation area (corresponds to S1, arbitration procedure, and arbitration processing). The arbitration unit 16 evaluates all the constraint equations and determines whether or not the arbitration process is successful (at S2). When the arbitration unit 16 determines that all the constraint equations are satisfied and determines that the arbitration process is successful ("YES" at S3), the arbitration unit sets the result as arbitration success and determines the content allocation (at S4). When the arbitration unit 16 determines that all the constraint equations are not satisfied and determines that the arbitration process has failed ("NO" at S3), the arbitration unit 16 sets the arbitration failure in the result and does not confirm the content allocation (at S5). The arbitration unit 16 performs post-processing to change the state of the content request (at S6). That is, the arbitration unit 16 determines whether or not it is necessary to change "a standby mode" to "a cancel mode" in the post-processing, and when it determines that it is not necessary to change, it remains "a standby mode" and when it determines that it is necessary to change, it changes from "a standby mode" to "a cancel mode".

(2) Post-Processing

Figure 13:
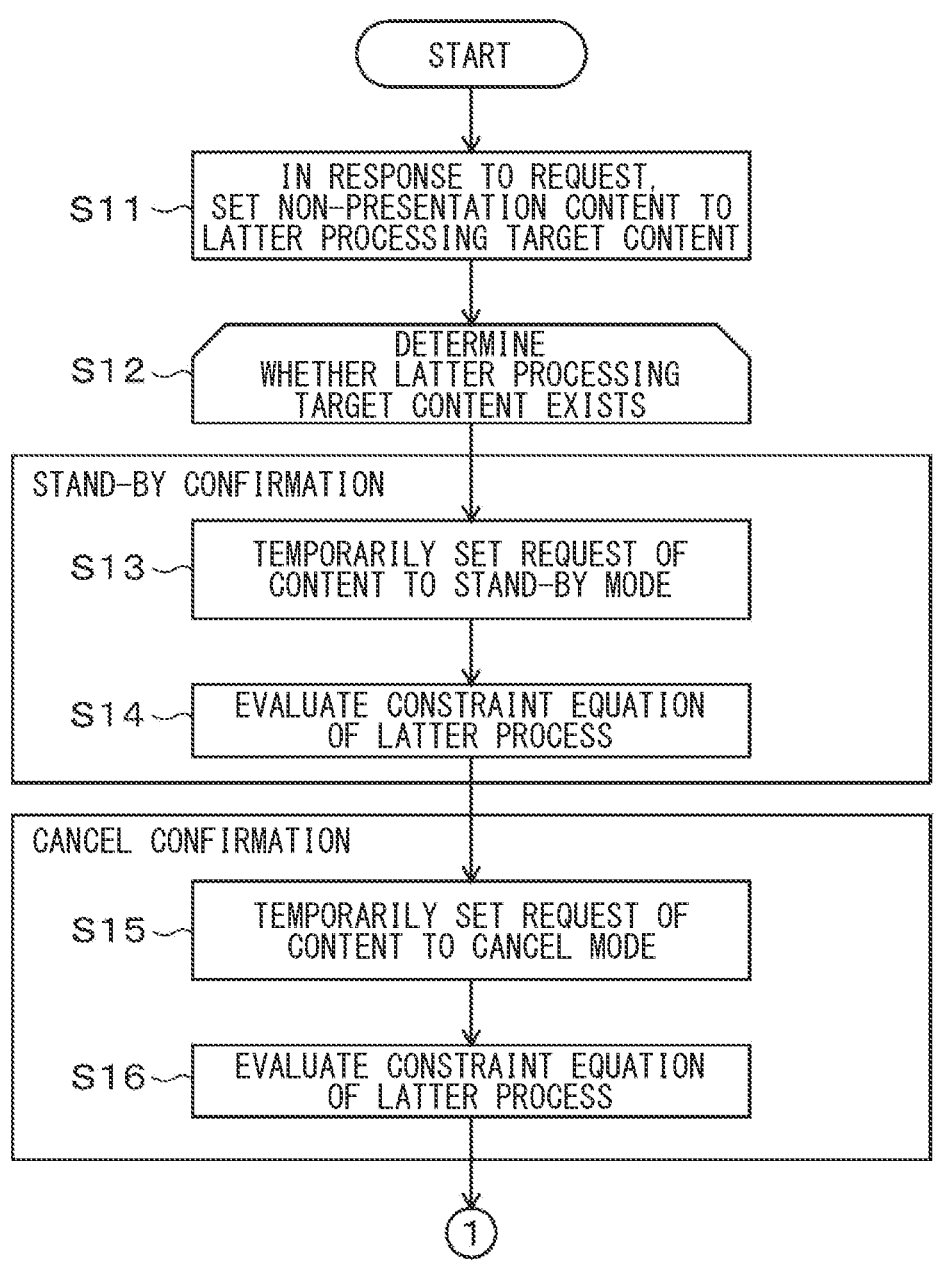
FIG. 13 is a flowchart showing a latter processing.
Figure 14:
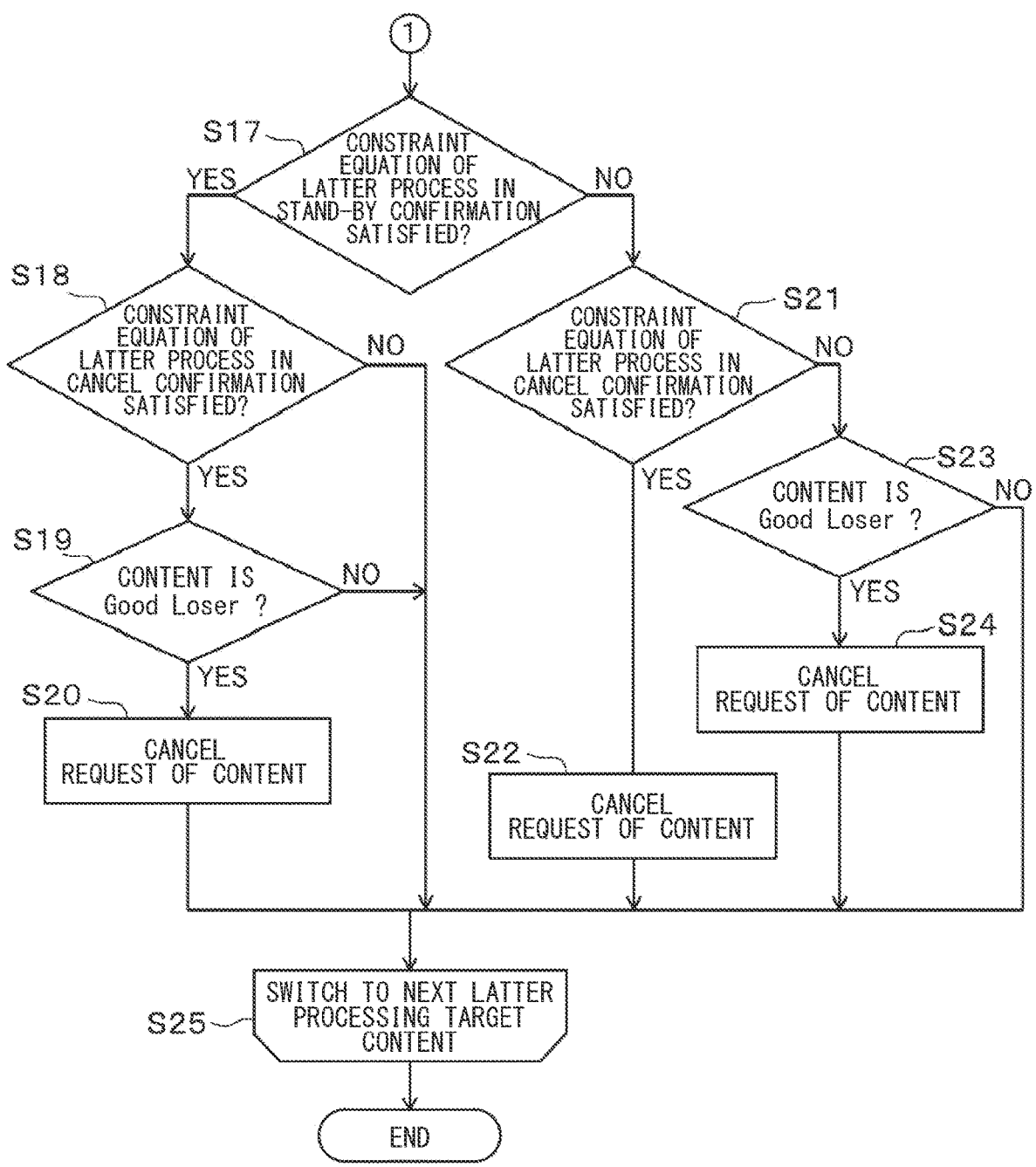
FIG. 14 is a flowchart showing a latter processing.

As shown in FIGS. 13 and 14, the arbitration unit 16 performs post-processing (corresponding to the exception rule evaluation procedure and the exception rule evaluation process). The arbitration unit 16 sets the requested and non-presented content as the post-processing target content (at S11). The arbitration unit 16 determines whether or not there is the post-processing target content (at S12). When the arbitration unit 16 determines that there is no post-processing target content, the loop ends.

In the post-processing, the arbitration unit 16 evaluates both "a standby mode" and "a cancel mode" for the content request as the evaluation of the constraint equation, and adopts the result of the one that satisfies the post-processing constraint equation. The arbitration unit 16 determines based on the content attribute (i.e., GoodLoser) when the same results are obtained, that is, when both "the standby mode" and "the cancel mode" are "TRUE" or both are "FALSE". When the constraint equation is correct, the arbitration unit 16 handles as an abnormal process since both "the standby mode" and "the cancel mode" as "FALSE". Hereinafter, a specific description will be given.

When the arbitration unit 16 determines that there is the post-processing target content, it temporarily sets the content request to be the standby mode (at S13) as a standby confirmation, and evaluates the post-processing constraint equation (at S14). As a cancellation confirmation, the arbitration unit 16 temporarily sets the content request to be the cancel mode (at S15) and evaluates the post-processing constraint equation (at S16).

The arbitration unit 16 determines whether or not the post-processing constraint equation of the standby confirmation is satisfied (at S17). When the arbitration unit 16 determines that the post-processing constraint equation of the standby confirmation is "TRUE" and the post-processing constraint equation of the standby confirmation is satisfied ("YES" at S17), the arbitration unit 16 determines whether the post-processing constraint equation of the cancellation confirmation is satisfied (at S18). When the arbitration unit 16 determines that the post-processing constraint equation of the cancellation confirmation is "FALSE" and the post-processing constraint equation of the cancellation confirmation is not satisfied ("NO" at S18), the arbitration unit 16 does not cancel, and maintains the standby mode. That is, the arbitration unit 16 uses the setting of the content that lost the arbitration as a basic rule, and leaves it as "on standby".

The arbitration unit 16 determines that the post-processing constraint equation for cancellation confirmation is "TRUE", and determines that the post-processing constraint equation for cancellation confirmation is satisfied ("YES" at S18), and determines whether or not the content is Good Loser (at S19). When the arbitration unit 16 determines that the content is not a Good Loser ("NO" at S19), the arbitration unit 16 also keeps the content request on standby without canceling it. That is, the arbitration unit 16 uses the setting of the content that lost the arbitration as a basic rule, and leaves it as "on standby".

When the arbitration unit 16 determines that the content is Good Loser ("YES" at S19), the arbitration unit 16 cancels the content request (at S20). That is, the arbitration unit 16 sets the setting of the content that lost the arbitration as an exception rule, and changes "the standby mode" to "the cancel mode".

When the arbitration unit 16 determines that the post-processing constraint equation of the standby confirmation is "FALSE" and the post-processing constraint equation of the standby confirmation is not satisfied ("NO" at S17), the arbitration unit 16 determines whether the post-processing constraint equation of the cancellation confirmation is satisfied (at S21). When the arbitration unit 16 determines that the post-processing constraint equation of the cancellation confirmation is "TRUE" and determines that the post-processing constraint equation of the cancellation confirmation is satisfied (#YES" at S21), the arbitration unit 16 cancels the content request (at S22). That is, in this case as well, the arbitration unit 16 sets the setting of the content that lost the arbitration as an exception rule, and changes "the standby mode" to "the cancel mode".

The arbitration unit 16 determines that the post-processing constraint equation for cancellation confirmation is "FALSE", and determines that the post-processing constraint equation for cancellation confirmation is not satisfied ("NO" at S21), and determines whether or not the content is Good Loser (at S23). When the arbitration unit 16 determines that the content is Good Loser ("YES" at S23), the arbitration unit 16 cancels the content request (at S24). That is, in this case as well, the arbitration unit 16 sets the setting of the content that lost the arbitration as an exception rule, and changes "the standby mode" to "the cancel mode".

When the arbitration unit 16 determines that the content is not a Good Loser ("NO" at S23), the arbitration unit 16 keeps the content request on standby without canceling it. That is, the arbitration unit 16 uses the setting of the content that lost the arbitration as a basic rule, and leaves it as "on standby". The arbitration unit 16 repeats the above processing for the next post-processing target content (at S25). In the above-mentioned processing, the case where the basic rule of the setting when the arbitration is lost is "a standby mode" has been described, similarly, the same applies to the case where the basic rule of the setting when the arbitration is lost is "a cancel mode".

In the above, the case of defining the constraint equation of the exception rule with a content as an unit has been described. Alternatively, a plurality of contents may be grouped and the constraint equation of the exception rule may be defined with a group as an unit. The case of grouping a plurality of contents, for example, includes: a case of grouping the contents having an expiration date (i.e., contents with an expiration date), and a case of grouping the content having a processing time longer than the others (i.e., contents having a long processing time).

Figure 15:
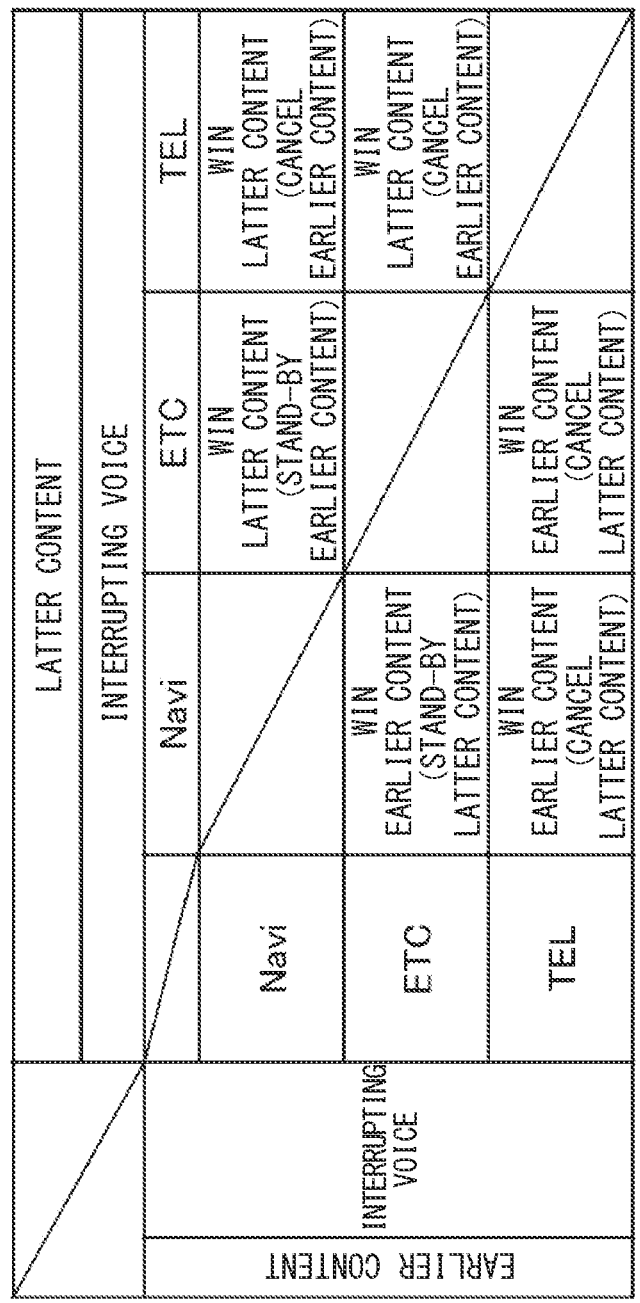
FIG. 15 is a diagram showing a specification before the change.

The case of grouping the contents with the characteristic having the expiration date will be described with reference to FIGS. 15 and 16. As shown in FIG. 15, the contents having an expiration date includes the navigation content and the ETC content, and FIG. 15 shows an example of a specification with an exception rule such that the presentation request of itself is withdrawn when the arbitration of the navigation content and the ETC content is lost to the telephone content.

In this case, the constraint equation of the exception rule is defined without using the group as a unit.

The constraint equation of "the request for presentation of navigation content is cancelled when the navigation content loses the arbitration to telephone content" is {Navi.isDefeatedBy(TEL)→Navi.isCanceled( )}.

The constraint equation of "the request for presentation of ETC content is cancelled when the ETC content loses the arbitration to telephone content" is {ETC.isDefeatedBy(TEL)→ETC.isCanceled( )}.

That is, it is necessary to describe two constraint equations for each of the navigation content and the ETC content.

On the other hand, the constraint equation of the exception rule is defined for each group as an unit, and the definition of the group is a content group with an expiration date, i.e., {Navi, ETC}.

As the definition of the exception rule that applies to the group, the constraint equation of "the content group with the expiration date is cancelled when the content group with the expiration date loses the arbitration to the telephone content" is {For-All Content Group with expiration date {x|x.isDefeatedBy (TEL)→x.isCanceled ( )}.

That is, one constraint equation common to the navigation content and the ETC content may be described.

As shown in FIG. 16, due to the specification change from this state, a case will be described such that the exception rule is to withdraw the presentation request of itself for the voice recognition content and the sign recognition content, in addition to the navigation content and ETC content, when the telephone content wins the arbitration. The constraint equation of the exception rule is defined without using the group as a unit, after the specification change, it is necessary to add and define the following two constraint equations in addition to the above two constraint equations before the specification change.

"the presentation request for a voice recognition content is cancelled when the voice recognition content loses the arbitration to a telephone content."

{Voice recognition.isDefeatedBy (TEL)→Voice recognition.isCanceled ( )}.

"The presentation request for a sign recognition content is cancelled when the sign recognition content loses the arbitration to a telephone content."

{Sign recognition.isDefeatedBy (TEL)→Sign recognition.isCanceled ( )}.

On the other hand, the constraint equation of the exception rule is defined for each group as an unit, and, after the specification is changed, as the definition of the group, a content group with an expiration date of {Navi, ETC, voice recognition, sign recognition} is defined.

As a definition of the exception rule applied to the group,

"the content group with the expiration date is cancelled when the content group with the expiration date loses the arbitration to the telephone content" and {For-All Content Group with expiration date {x|x.isDefeatedBy (TEL)→x.isCanceled ( )} are adopted without changing.

That is, by grouping the contents with the expiration date and using the constraint equation including "For-All", it is possible to define the constraint equation in which all the elements of the set satisfy the condition. By grouping the contents, the constraint equation can be described abstractly, and when the contents increase due to the specification change, it can be handled by simply editing the definition of the group.

Next, the case of grouping the content having the characteristic that the processing time is longer than the others will be described with reference to FIGS. 17 and 18. As shown in FIG. 17, the content having a characteristic that the processing time is longer than the others is the telephone content, and an example of a specification in which the exception rule is to withdraw the presentation request of the other party when the telephone content is arbitrated and won for the navigation content will be described.

In this case, the constraint equation of the exception rule is defined without using the group as a unit.

The constraint equation of "the request for presentation of navigation content is cancelled when the navigation content loses the arbitration to telephone content" is {Navi.isDefeatedBy(TEL)→Navi.isCanceled( )}.

On the other hand, the constraint equation of the exception rule is defined for each group as an unit, and the definition of the group is content group with long processing time of {TEL}.

As the definition of the exception rule that applies to the group, the constraint equation of "Navigation content is canceled if it loses arbitration to any of the content group with long processing time" is {Exists Content group with long processing time {x|Navi.isDefeatedBy (Δ)}→Navi.isCanceled ( )}.

As shown in FIG. 18, when the specification is changed from this state, a case will be described such that the exception rule is to withdraw the presentation request of the other party when the navigation content is arbitrated and lost for the voice recognition content and the sign recognition content in addition to the telephone content. The constraint equation of the exception rule is defined without using the group as a unit, after the specification change, it is necessary to add and define the following two constraint equations in addition to the above one constraint equations before the specification change.

"The presentation request for the navigation content is cancelled when the navigation content loses the arbitration to voice recognition content."

{Navi.isDefeatedBy(Voice recognition)→! Navi.isCancelled( )}.

"The presentation request for the navigation content is cancelled when the navigation content loses the arbitration to sign recognition content."

{Navi.isDefeatedBy(Sign recognition)→Navi.isCanceled( )}

On the other hand, the constraint equation of the exception rule is defined for each group as an unit, and, after the specification is changed, as the definition of the group, the content group with long processing time of {TEL, voice recognition, sign recognition} is defined.

As a definition of the exception rule applied to the group, the constraint equation of "Navigation content is canceled if it loses arbitration to any of the content group with long processing time" and {Exists Content group with long processing time {x|Navi.isDefeatedBy (x)}→Navi.isCanceled( )} are adopted without changing.

That is, by grouping the content group with long processing time and using a constraint equation including "Exists", it is possible to define a constraint equation in which at least one of the elements of the set satisfies the condition. In this case, by grouping the contents, the constraint equation can be described abstractly, and when the contents increase due to the specification change, it can be handled by simply editing the definition of the group.

Next, a case where the contents with the characteristic having the expiration date is grouped and the contents with the characteristic having a processing time longer than the others is grouped will be described with reference to FIGS. 19 and 20. In this case, it is equivalent to the case where the specifications shown in FIGS. 15 and 16 and the specifications shown in FIGS. 17 and 18 are combined. As shown in FIG. 19, the specifications are shown to have the exception rule such that the contents having the characteristic of having an expiration date are the navigation content and the ETC content, the request for presentation of itself is withdrawn when the navigation content and the ETC content are arbitrated and lost to the telephone content, the content with the processing time longer than others is the telephone content, and the request for presentation of the other party is withdrawn when the telephone content is arbitrated and wins by the navigation content.

In this case, the constraint equation of the exception rule is defined without using the group as a unit.

The constraint equation of "the request for presentation of navigation content is cancelled when the navigation content loses the arbitration to telephone content" is {Navi.isDefeatedBy(TEL)→Navi.isCanceled( )}.

The constraint equation of "the request for presentation of ETC content is cancelled when the ETC content loses the arbitration to telephone content" is {ETC.isDefeatedBy(TEL)→ETC.isCanceled( )}.

That is, it is necessary to describe two constraint equations for each of the navigation content and the ETC content.

On the other hand, the constraint equation of the exception rule is defined for each group as an unit, and the definition of the group is a content group with an expiration date, i.e., {Navi, ETC}.

content group with long processing time of {TEL}.

As the definition of the exception rule that applies to the group, the constraint equation of "the content group with expiration date will be canceled if the arbitration is lost to any one of the content groups with the long processing time" is For-All Losing Cancellation Content Group, {x|Exists Winning opponent cancellation content group {y|x.isDefeatedBy (y)}→x.isCanceled( )}.

Due to the specification change from this state, as shown in FIG. 20, a case will be described such that the exception rule is to withdraw the presentation request of itself when the voice recognition content and the sign recognition content are arbitrated to lose to the telephone content, in addition to the navigation content and the ETC content, and to withdraw the presentation request of the other party when the voice recognition content and the sign recognition content are arbitrated to win the navigation content, in addition to the telephone content. The constraint equation of the exception rule is defined without using the group as a unit, after the specification change, it is necessary to add and define the following four constraint equations in addition to the above two constraint equations before the specification change.

"The presentation request for the navigation content is cancelled when the navigation content loses the arbitration to voice recognition content."

{Navi.isDefeatedBy(Voice recognition)→! Navi.isCancelled( )}.

"The presentation request for the navigation content is cancelled when the navigation content loses the arbitration to sign recognition content."

{Navi.isDefeatedBy(Sign recognition)→Navi.isCanceled( )}.

"The presentation request for the ETC content is cancelled when the ETC content loses the arbitration to voice recognition content."

{ETC.isDefeatedBy(Voice recognition)→ETC.isCanceled( )}

"The presentation request for the ETC content is cancelled when the ETC content loses the arbitration to sign recognition content."

{ETC.isDefeatedBy(Sign recognition)→ETC.isCanceled( )}

On the other hand, the constraint equation of the exception rule is defined for each group as an unit, and, after the specification is changed, as the definition of the group, a content group with an expiration date, i.e., {Navi, ETC}.

the content group with long processing time of {TEL, voice recognition, sign recognition} is defined.

As a definition of the exception rule applied to the group,

For-All Losing Cancellation Content Group,

{x|Exists Winning opponent cancellation content group {y|x.isDefeatedBy (y)}→x.isCanceled( )} are adopted without changing.

That is, even when the content with the expiration date and the content with the characteristic that the processing time is longer than others are grouped at the same time, the constraint equation is abstracted by using the constraint equation including "For-All" and "Exists". It can be handled only by simply editing the group definition when the contents increase due to the specification change.

As described above, the present embodiment can produce the following effects and functions.

In the presentation control device 11, a rule definition is memorized such that includes: an attribute of the content that defines either a cancellation for withdrawing the presentation request or a wait that does not withdraw the presentation request; and a constraint expression that defines an exception rule that defines the setting of the content that has lost arbitration as either a wait or a cancellation. When a content presentation request is generated from another application while the content of one application is being presented, the content to be presented with priority is arbitrated based on the rule definition.

As the setting of the content that has lost arbitration, the setting of the content that has lost the arbitration can be freely changed by defining the default setting of the content with the content attribute and the exceptional setting of the content with the constraint expression. In this case, since only the exception rule needs to be defined by the constraint expression, it is possible to avoid reduction of the maintainability of the rule definition. As a result, the setting of the content that lost the arbitration can be freely changed without reducing the maintainability of the rule definition.

In the presentation control device 11, a plurality of contents are grouped, and the constraint equation of the exception rule is defined for each group as an unit. When the contents for defining the setting increases, it can be dealt with appropriately and easily simply by editing the definition of the group.

Although the present disclosure has been made in accordance with the embodiments, it is understood that the present disclosure is not limited to such embodiments and structures. The present disclosure incorporates various modifications and variations within a scope of equivalents. Additionally, various combinations and configurations, as well as other combinations and configurations including more, less, or only a single element, are within the scope and spirit of the present disclosure.

It may be applied not only to the vehicle but also to the content presentation control device for purposes other than the vehicle.

As the content, the navigation content, the ETC content, the telephone content, the voice recognition content, and the sign recognition content are exemplified, alternatively, the content that provides other applications may be included.

As the content to be grouped, the content having a characteristic having an expiration date and the content having a characteristic having a longer processing time than others are exemplified, alternatively, the content having other characteristics may be included.

The control unit and the method according to the present disclosure may be achieved by a dedicated computer provided by constituting a processor and a memory programmed to execute one or more functions embodied by a computer program. Alternatively, the control unit and the method according to the present disclosure may be achieved by a dedicated computer provided by constituting a processor with one or more dedicated hardware logic circuits. Alternatively, the control unit and the method according to the present disclosure may be achieved using one or more dedicated computers constituted by a combination of the processor and the memory programmed to execute one or more functions and the processor with one or more hardware logic circuits. The computer program may be stored in a computer-readable non-transitory tangible storage medium as an instruction to be executed by the computer.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A content presentation control device comprising:
    an application storage unit that stores an application for generating a presentation request of a content;
    a rule definition storage unit that stores a rule definition including: an attribute of the content that defines either a cancellation for withdrawing the presentation request or an on-standby without withdrawing the presentation request; and a constraint equation that defines an exception rule for defining a setting of the content that has lost arbitration as either the on-standby or the cancellation;
    an arbitration unit that arbitrates which content is preferentially presented based on the rule definition stored in the rule definition storage unit when another presentation request of another content is generated from another application while the content of one application is being presented; and
    a presentation control unit that presents one of the content and the other content arbitrated by the arbitration unit to a presentation area, wherein
    the arbitration unit evaluates the exception rule for another one of the content and the other content that has lost an arbitration, and
    the arbitration unit evaluates the exception rule for both a case where the setting of the other one of the content and the other content that has lost the arbitration is the on-standby and a case where the setting of the other one of the content and the other content that has lost the arbitration is the cancellation.

2. The content presentation control device according to claim 1, wherein:
    the arbitration unit applies the exception rule when an evaluation result of the exception rule corresponds to the exception rule.

3. The content presentation control device according to claim 1, wherein:
    the arbitration unit applies the attribute of the content when an evaluation result of the exception rule does not correspond to the exception rule.

4. The content presentation control device according to claim 1, wherein:
    the rule definition storage unit stores the rule definition including the constraint equation that defines the exception rule with a group in which a plurality of contents are grouped as a unit.

5. The content presentation control device according to claim 4, wherein:
    the rule definition storage unit stores the rule definition including the constraint equation that defines the exception rule with the group in which the plurality of contents having an expiration date are grouped as a unit.

6. The content presentation control device according to claim 4, wherein:
    the rule definition storage unit stores the rule definition including the constraint equation that defines the exception rule with the group in which the plurality of contents having a processing time longer than others are grouped as a unit.

7. The content presentation control device according to claim 1, further comprising:
    one or more processors; and
    a memory coupled to the one or more processors and storing program instructions that when executed by the one or more processors cause the one or more processors to provide at least: the arbitration unit and the presentation control unit.

8. A presentation control method for a content comprising:
    a presentation request acceptance procedure for accepting another presentation request of another content from another application while presenting a content of one application;
    an arbitration procedure for arbitrating which content is preferentially presented based on a rule definition including: an attribute of the content that defines either a cancellation for withdrawing the presentation request or an on-standby without withdrawing the presentation request; and a constraint equation that defines an exception rule for defining a setting of the content that has lost arbitration as either the on-standby or the cancellation; and
    a presentation control procedure for presenting one of the content and the other content arbitrated by the arbitration procedure to a presentation area, wherein
    the arbitration procedure evaluates the exception rule for another one of the content and the other content that has lost an arbitration, and
    the arbitration procedure evaluates the exception rule for both a case where the setting of the other one of the content and the other content that has lost the arbitration is the on-standby and a case where the setting of the other one of the content and the other content that has lost the arbitration is the cancellation.

9. The presentation control method for the content according to claim 8, further comprising:
    an exception rule evaluation procedure for evaluating the exception rule for another one of the content and the other content that has lost an arbitration.

10. A non-transitory tangible computer readable storage medium comprising instructions being executed by a computer, the instructions including a computer-implemented method for displaying a three-dimensional image on a display, the instructions including:
    accepting another presentation request of another content from another application while presenting a content of one application;

arbitrating which content is preferentially presented based on a rule definition including: an attribute of the content that defines either a cancellation for withdrawing the presentation request or an on-standby without withdrawing the presentation request; and
a constraint equation that defines an exception rule for defining a setting of the content that has lost arbitration as either the on-standby or the cancellation; and
presenting one of the content and the other content arbitrated in the arbitrating of the content and the other content to a presentation area, wherein
the arbitrating evaluates the exception rule for another one of the content and the other content that has lost an arbitration, and
the arbitrating evaluates the exception rule for both a case where the setting of the other one of the content and the other content that has lost the arbitration is the on-standby and a case where the setting of the other one of the content and the other content that has lost the arbitration is the cancellation.

11. The non-transitory tangible computer readable storage medium according to claim 10, the instructions including:
evaluating the exception rule for another one of the content and the other content that has lost an arbitration.

* * * * *